Oct. 31, 1961　　　　　J. FERLA　　　　　3,006,410
MACHINES FOR PRODUCING REINFORCED PLASTIC PIPES
Filed Aug. 31, 1955　　　　　　　　　　　　2 Sheets-Sheet 1
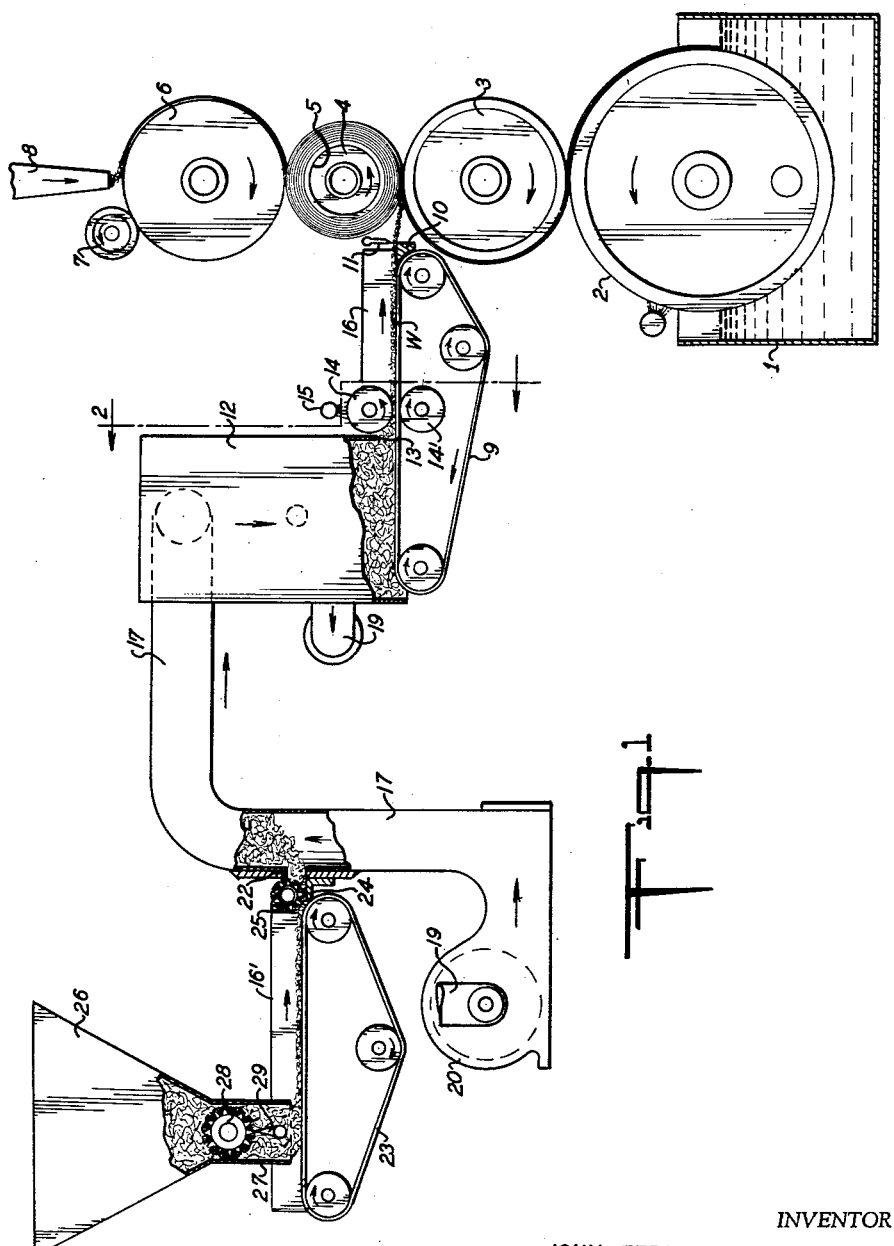
INVENTOR
JOHN FERLA Oct. 31, 1961 J. FERLA 3,006,410
MACHINES FOR PRODUCING REINFORCED PLASTIC PIPES
Filed Aug. 31, 1955 2 Sheets-Sheet 2
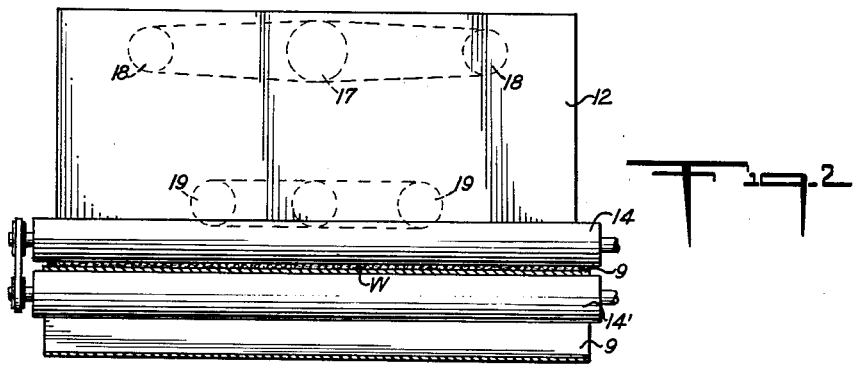
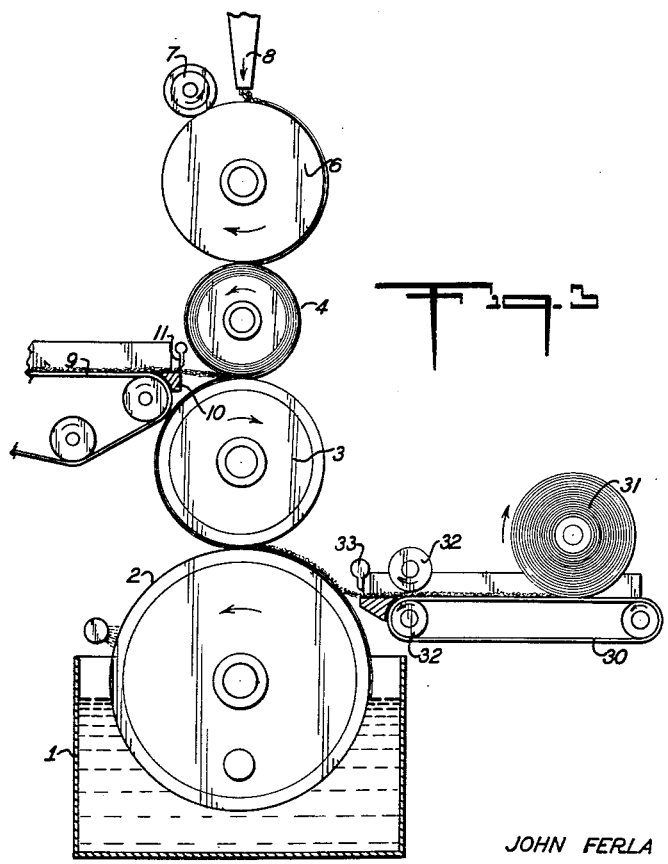
INVENTOR
JOHN FERLA
BY
ATTORNEYS «United States Patent Office»

3,006,410
MACHINES FOR PRODUCING REINFORCED PLASTIC PIPES
John Ferla, 5 Whitney Place, East Orange, N.J.; Irma Ferla, executrix of said John Ferla, deceased, assignor to herself
Filed Aug. 31, 1955, Ser. No. 531,685
2 Claims. (Cl. 162—284)

This invention relates to improvements in machines for producing pipe of moldable material such as asbestos fibers, cement, fiberglass and other suitable compositions, preferably diatomaceous earth.

It has been proposed heretofore to form pipe of asbestos cementitious material applied to a mandrel and compacted under pressure to build up on the mandrel a desired layer which, when set, forms a pipe. Such pipe, formed of asbestos cement composition, has definite limitations both as to the smallness of the size thereof and as to the amount of pressure to which it may be subjected, making it undesirable for use for many applications.

I have discovered that the characteristics of the pipe may be improved materially by adding to the composition a suitable quantity of glass fibers, such as glass wool, in a dry or semidry state, or in a liquid pulp, or both, which may be utilized in forming a pipe having an inside diameter as small as from one inch and up. This will withstand both high temperatures and high pressures. The percentage of asbestos controls the temperature of the finished pipe.

One object of this invention is to improve the construction of machines for producing pipe by providing for the feeding of glass wool or fibers alone or mixed with asbestos fibers to a mandrel on which a cement or refractory material is applied, where the entire material is compacted under substantial pressure to form a pipe having the desired characteristics.

Another object of the invention is to provide mechanism for preparing and feeding to a pipe forming machine, glass fibers or glass wool and a binder such as starch, water glass, etc., in a manner that will form a layer on the mandrel of the machine between layers of cement or composition material which will be compacted thereby.

These objects may be accomplished, according to one embodiment of the invention, by providing a machine adapted to receive a mandrel between calendering rolls to compact the composition substantially into a homogeneous mass. The layers may be applied either in semi-dry state or, by the addition of some water, in wet state, but ordinarily no heat is required for setting of the cementitious material inasmuch as air drying is usually sufficient.

Provision is made for supplying a layer or layers of strengthening and binding material to the cementitious composition. This may be done by forming glass fibers or glass wool as a web which is fed onto the previously applied composition on the mandrel, between successive layers thereof, where it may be compacted into homogenous relation in said composition. It is preferred that the web be supplied on a belt or other suitable conveyor from an air suspension of the fibers to obtain a complete and thorough blending thereof in proper relation to bond the cementitious layers and asbestos together.

This air suspension is obtained, preferably, by supplying the fibers, either with or without some asbestos material being incorporated therein, from a hopper into an air stream that is directed under pressure to the suspension chamber. I have found that such supply produces a desired mixture of the glass wool fibers in a web that will bond to the cementitious material in a very compact structure which will withstand high temperatures and pressures even when made of small diameters.

Certain embodiments of the invention are illustrated in the accompanying drawings, in which:

FIG. 1 is a diagrammatic side elevation of a pipe forming machine showing the invention applied thereto;

FIG. 2 is a cross section therethrough on the line 2—2 in FIG. 1; and

FIG. 3 is a view similar to FIG. 1, showing a modification of the fiber feeding device.

I have shown in FIG. 1 an application of the invention for forming or producing a pipe without the application of heat thereto. In this embodiment, the machine utilizes both liquid and semi-dry layers, but this is capable of variation according to the properties of the formed pipe to be produced.

The numeral 1 indicates a vat in which a liquid suspension of cementitious or composition material is contained, the normal level thereof being indicated by the dotted lines. Mounted in the vat 1 is a molding screen 2 which operates in the liquid suspension to supply a layer of composition material which will adhere to the wire screen surface of the molding screen 2 as the latter is rotated in the direction indicated by the arrow in FIG. 1.

Superposed over the molding screen 2 is a transfer or calendering roll 3, having the periphery thereof spaced from the periphery of the molding screen just sufficiently for a layer of the composition material to pass therebetween. The roll 3 is mounted to support the entire load of the mandrel and the superposed calendering roll. The roll 3, used in cooperation with a mold screen, ordinarily has a fabric surface, with or without a suitable felt, or the like, to which the layer on the periphery of the mold screen will adhere and thereby will be transferred from the periphery of the mold screen to the periphery of the roll 3 as these rotate substantially in engagement with each other in the direction indicated by the arrows in FIG. 1.

The mandrel is indicated at 4. This mandrel 4 may be in the form of a hollow shell or as a solid shaft, although it is preferable that it should have a shell thereover, as indicated at 5, which may be removable from the mandrel 4 and remain as a part of the pipe formed thereon, either permanently or during setting of the composition material.

A calendering roll is shown at 6, superposed over the mandrel 4 and mounted in any suitable manner for up and down movement in the machine for coacting pressure relation against the composition material applied to the periphery of the mandrel. The calendering roll 6 preferably is in the form of a steel roll having a smooth surface and operates in the direction indicated by the arrow in FIG. 1. An atomizing roll is shown at 7 for supplying a layer of moisture, such as water, to the periphery thereof at a point adjacent the discharge end of a hopper spout shown at 8. The hopper preferably contains a dry mixture of asbestos cementitious material or other suitable composition, such as asbestos or glass fibers, cement, etc., in a homogeneous mixture, which is directed through the spout 8 onto the wet peripheral surface of the calendering roll 6. The layer of material so applied will adhere to the wet surface during rotation of the calendering roll 6 and will be transferred therefrom onto the previously applied layers on the mandrel 4.

The calendering roll 6 should be mounted for movement toward and from the periphery of the mandrel 4, not only to accommodate various thicknesses of composition material therebetween, but also to apply suitable pressure to the material on the periphery of the mandrel. Pressures of the order of from 600 lbs. to 800 lbs. per square inch may be used, more or less, according to the wall thicknesses desired and the diameter of the pipe to be formed, as well as the use to be made of the pipe so produced.

Provision is made for supplying a layer or web of binding material, preferably comprising or including glass wool or glass fibers, to the bite between the mandrel 4 and the supply roll 3. This material is preferably in the form of a web or sheet which is supplied continuously or intermittently during the formation of the desired wall thickness. A conveyor is shown at 9, preferably in the form of a wide belt conveyor, for this purpose. The upper run of the belt conveyor 9 has a block 10 at the discharge end thereof, not only to prevent the material from sticking to the periphery of the belt as the latter passes over the guide roll thereof, but also to coact with a cutter, shown at 11, which severs the web when the desired quantity of web has been supplied or when the pipe is formed to the desired thickness.

The belt 9 operates under the open bottom of a chamber 12 which has a discharge outlet 13 in the forward side thereof adjacent a pair of rolls 14 and 14' that are arranged in opposed relation on opposite sides of the belt 9 and on opposite sides of the web W. The roll 14 preferably is adjustably mounted, to be shifted toward and from the roll 14' to vary the extent of compaction of the web therebetween. The periphery of the roll 14 may be wet as by a sprayer 15, if desired, to facilitate the compacting of the material. Water may be used in the sprayer 15 if the material in the web contains cement or other binding material. However, if the glass wool is being used alone to make a roll, a binder should be added thereto by the sprayer 15, such as standard liquid glue, or liquid starch or the like.

The chamber 12 is a relatively large enclosed chamber adapted to receive the material in aerated condition therein, and is either transparent or has a window in a side thereof. Thereby the operator can observe the fibers supplied thereto through a supply pipe, conduit or air duct 17 having branch outlets 18 at different points in the chamber 12, as indicated in FIG. 2. This material is blown into the chamber and the air is discharged through a suction line shown at 19, connected at suitable points near the bottom of the chamber. The outlets of the suction line 19 should be screened or otherwise protected to prevent the discharge of the fibrous material therethrough, and may have a valve therein to regulate the amount of suction.

The supply conduit 17 extends laterally and downwardly from the chamber 12 and is connected with the discharge side of a blower 20, the air inlet of which may be connected with the pipe 19, and also have a separate air inlet, if desired. The blower 20 supplies air under pressure through the conduit 17, as will be apparent from FIG. 1.

At one side of the conduit 17, an entrance mouth 22 is formed at a point adjacent the discharge side of a conveyor belt 23, the sides of which may be adjusted toward and from each other to regulate the quantity of material being fed to said conduit. The upper run of the belt 23 extends substantially in alignment with the mouth 22 and to a point adjacent thereto, with an intervening block 24 at one side of the mouth extending from the latter toward the discharge end of the conveyor belt 23 to facilitate the direction of material from the upper run of the belt through the mouth into the supply conduit 17. A fiber brush is shown at 25, mounted over the discharge end of the belt 23 in coacting relation with the block 24. The brush may move up and down relative thereto to facilitate the transfer of the material through the mouth and to seal the mouth against the discharge of air from the pipe 17. The brush 25 is preferably driven in synchronization with the belt 23 as by a chain drive (not shown).

Material is supplied onto the conveyor belt 23 from a hopper 26 having a spout 27 at the lower end thereof extending downwardly substantially to the upper surface of the top run of the conveyor belt 23. A distributing brush is shown at 28 mounted in the spout 27 to facilitate the feeding of the material therethrough onto the belt. A cleaning fork is shown at 29 in coacting relation with the brush 28 to prevent accumulation of the fibers on the latter. The material may be confined on the belt 23 by side rails 16' if desired.

Glass wool, fibers or mineral wool may be supplied in the hopper 26, either alone or mixed with asbestos fibers with some fine cement, if desired. This mixture is supplied onto the belt 23 and is fed by the latter and by the brush 25 through the mouth 22 of the air duct 17. The supply of air through the latter under high pressure will carry the fibrous composition into the mixing chamber 12 in an aerated condition. The operator can inspect the fibers in a "snowstorm" condition in the chamber 12, and vary the speed of the blower or fan 20 to obtain the proper action. This will produce perfect blending of the fibers in such relation that the latter may settle down onto the upper run of the belt conveyor 9 in the form of a web, as indicated at W in FIG. 1.

This web is supplied by the conveyor 9 to the bite between the mandrel 4 and the roll 3, and preferably is sandwiched between layers of asbestos cement material applied on the mandrel with or without glass fibers therein, so as to add material strength to the pipe, according to the wall thickness thereof. The addition of such fibers enables the asbestos cement pipe to be made in much smaller diameters than has been possible heretofore and yet it will withstand high temperatures and pressures, as desired.

Instead of, or in addition to, the web of fibrous material supplied in the manner shown in FIG. 1, it is also possible to apply a web to the periphery of the mold screen 2, if desired, as shown in FIG. 3. The additional web of glass fibers will increase the strength of the pipe. This rolled web may be supplied at the bite between the roll 3 and the mandrel, if desired. This web is composed of glass fibers, glass wool and a binder such as starch, glue, water glass, etc.

In this modification, a conveyor belt 30 extends laterally from the mold screen 2, and preferably synchronized therewith. The belt 30 is in position to supply a web directly to the upper surface of the mold screen 2, at a point below the point of contact between the latter and the roll 3. While an aerated mixture of fibrous material may be used to supply the web to the conveyor 30, I have shown a roller 31 having a web of long fibers or glass wool, wound thereon and supported by gravity over the belt conveyor 30 to be fed by the latter and by feed rolls 32 to the periphery of the mold screen 2. A cutter is shown at 33.

The long fibrous glass wool web thus supplied will be applied to the mandrel 4 between layers of fibrous material, to strengthen and reinforce the pipe formed thereby. In other respects, this form of the invention operates in the same manner as described above.

According to this invention, the manufacture of pipe and similar composition materials utilizes glass fibers or glass wool, which may be added with cement or other refractory material. A web can be used in the manufacture of pipe by adding glass fibers or glass wool mixtures to make the web with a small percentage of binder, such as sodium silicate or starch.

Asbestos can be mixed with the glass fibers or glass wool and mixed with cement to form a uniform homogeneous material and from which a pipe or other suitable product may be formed. Driers can be used in the composition to facilitate the drying of the material and the curing of the pipe. A filler, such as diatomaceous earth, can also be used. It is preferred that some asbestos be used in the composition which absorbs moisture and helps to dry the pipe. The glass wool or glass fiber does not absorb moisture, but makes a more condensed pipe of less porosity.

A homogeneous mixture of glass fibers and a fine cement may be reinforced with a web of long glass fibers. This web extends outward in spiral fashion as the pipe is formed from the inner to the outer circumference thereof.

Due to the glass fibers, the finished pipe is highly resistant to corrosion. It will withstand extremely high temperatures and pressures and is a nonconductor of electricity. Due to the special multiply accumulation, as it is formed by the layering method, a superior product is obtained with a very uniform density. The layers are pressed tightly one upon another on the mandrel or core. The entire operation may be observed at all times, providing for uniformity of product.

While the invention is described in connection with asbestos cement pipe, it is recognized that other compositions may be used in place of asbestos cement. For example, cement and glass fibers may be used together, without the asbestos.

While the invention has been illustrated and described in certain embodiments, it is recognized that other variations and changes may be made therein without departing from the invention, as set forth in the claims.

I claim:

1. In a machine for producing pipe, a vat containing a liquid suspension of composition material, a rotating mandrel thereabove, means below said mandrel for transferring layers of said material from said vat onto said mandrel, a hopper for containing asbestos cementitious material and disposed above said mandrel, a vertically adjustable calendering roll interposed between said hopper and mandrel for transferring layers of said asbestos cementitious material from said hopper onto said mandrel interposed between the layers of said composition material on said mandrel and compressing the sandwiched layers of both said materials on said mandrel, means for supplying a reinforcing web of loose glass fibrous material to the mandrel between said layers of composition and asbestos fibrous material, whereby the glass fibrous material is intermeshed with the layers of said composition and asbestos cementitious materials.

2. In a machine for producing pipe, a vat containing a liquid suspension of composition material, a rotating mandrel thereabove, means below said mandrel for transferring layers of said material from said vat onto said mandrel, a hopper for containing asbestos cementitious material and disposed above said mandrel, a vertically adjustable calendering roll interposed between said hopper and mandrel for transferring layers of said asbestos cementitious material from said hopper onto said mandrel interposed between the layers of said composition material on said mandrel and compressing the sandwiched layers of both said materials on said mandrel, means for supplying a reinforcing web of loose glass fibrous material to the mandrel between said layers of composition and asbestos fibrous material, whereby the glass fibrous material is intermeshed with the layers of said composition and asbestos cementitious materials, said means comprising a horizontal conveyor, said conveyor being disposed laterally of said mandrel and extending to the bite between said mandrel and said transferring means.

References Cited in the file of this patent

UNITED STATES PATENTS

| | | |
|---|---|---|
| 1,648,475 | Darwin | Nov. 8, 1927 |
| 1,979,656 | Whitman | Nov. 6, 1934 |
| 2,177,643 | Ferla | Oct. 31, 1939 |
| 2,280,252 | Muehleck | Apr. 21, 1942 |
| 2,367,844 | Cuno | Jan. 23, 1945 |
| 2,373,672 | Ferla | Apr. 17, 1945 |
| 2,413,551 | Englund | Dec. 31, 1946 |
| 2,470,068 | Contenson | May 10, 1949 |
| 2,483,404 | Francis | Oct. 4, 1949 |
| 2,543,101 | Francis | Feb. 27, 1951 |
| 2,581,069 | Bertolet | Jan. 1, 1952 |
| 2,614,058 | Francis | Oct. 14, 1952 |
| 2,649,133 | Just | Aug. 18, 1953 |
| 2,696,353 | Vessels | Dec. 7, 1954 |
| 2,711,381 | Novotny et al. | June 21, 1955 |
| 2,711,982 | Straka | June 28, 1955 |
| 2,748,831 | Nash | June 5, 1956 |
| 2,777,501 | Fischer | Jan. 15, 1957 |
| 2,778,759 | Stephens et al. | Jan. 22, 1957 |

FOREIGN PATENTS

| | | |
|---|---|---|
| 405,659 | Great Britain | Feb. 9, 1934 |